United States Patent
Wan et al.

(10) Patent No.: US 11,042,426 B2
(45) Date of Patent: Jun. 22, 2021

(54) UTILIZING REUSABLE AJAX REQUESTS

(71) Applicant: International Business Machines Corporation, Armonk, NY (US)

(72) Inventors: Shu Chao Wan, Beijing (CN); Jing Jing Pan, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/109,847

(22) Filed: Aug. 23, 2018

(65) Prior Publication Data

US 2020/0065169 A1  Feb. 27, 2020

(51) Int. Cl.
*G06F 9/54* (2006.01)

(52) U.S. Cl.
CPC ................... *G06F 9/547* (2013.01)

(58) Field of Classification Search
CPC ........................................ G06F 9/547
See application file for complete search history.

(56) References Cited

U.S. PATENT DOCUMENTS

| | | | |
|---|---|---|---|
| 8,990,289 B2 | 3/2015 | Mott et al. | |
| 9,558,294 B2 | 1/2017 | Kartoun | |
| 9,672,285 B2 | 6/2017 | Burkhard et al. | |
| 2008/0010345 A1* | 1/2008 | Curtis | G06F 16/95 709/205 |
| 2008/0301300 A1 | 12/2008 | Toub | |
| 2010/0088612 A1* | 4/2010 | Jia | G06F 16/9574 715/745 |
| 2011/0258532 A1 | 10/2011 | Ceze et al. | |
| 2013/0204857 A1 | 8/2013 | Kartoun | |
| 2014/0143644 A1 | 5/2014 | Smedberg et al. | |
| 2014/0237066 A1 | 8/2014 | Fainberg et al. | |
| 2020/0374280 A1* | 11/2020 | Zeng | H04L 63/0853 |

FOREIGN PATENT DOCUMENTS

EP         2116939 A1    11/2009

OTHER PUBLICATIONS

W3schools; jQuery—AJAX get() and post() Methods; https://www.w3schools.com/jquery/jquery_ajax_get_post.asp; archived Jul. 2, 2017; 6 pages (Year: 2017).*
Dhote et al., "Performance Testing Complexity Analysis on Ajax-Based Web Applications" IEEE Software, vol. 30, Issue 6, Nov.-Dec. 2013, pp. 70-74.

(Continued)

*Primary Examiner* — Doon Y Chow
*Assistant Examiner* — Kimberly L Jordan
(74) *Attorney, Agent, or Firm* — Jamar K. Ray

(57) ABSTRACT

Embodiments of the present disclosure relate to reuse ongoing reusable Ajax requests. According to the method, one or more processors receive a first Ajax request in a web application. The method further includes detecting at least one ongoing Ajax request comprising a second ongoing reusable Ajax request. The second ongoing Ajax request may be substantially similar to the first Ajax request. The method further includes receiving the second ongoing reusable Ajax request from a server of the web application. The method further includes executing a call-back function of the second ongoing reusable Ajax request.

20 Claims, 8 Drawing Sheets

(56) References Cited

OTHER PUBLICATIONS

Lennon, J., "Maximizing JavaScript and Ajax Performance," IBM developerWorks, Sep. 28, 2010, 14 pgs., ©IBM Corporation 2010.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

| Name | Status |
|---|---|
| ☐ sddcs?env_id=ibm:ys1:us-so... 1003 1001 | (canceled) 1002 (pending) 1004 |
| ☐ vcenters?env_id=ibm:ys1:us-... | |

FIG. 10

| Name | Status |
|---|---|
| ☐ sddcs?env_id=ibm:ys1:us-so... 1101 | (canceled) 1102 |
| ☐ vcenters?env_id=ibm:ys1:us-... 1103 | (canceled) 1104 |
| ☐ sddcs?env_id=ibm:ys1:us-so... 1105 | (pending) 1106 |

FIG. 11

UTILIZING REUSABLE AJAX REQUESTS

BACKGROUND

The present disclosure relates to the field of browser technology, and more specifically, to methods, systems and computer program products for reusing ongoing Ajax requests.

Asynchronous JavaScript+XML can be referred to as Ajax or AJAX for short, which is a set of Web development techniques. With Ajax requests, web applications can send and retrieve data from a server asynchronously without interfering with the display and behavior of the existing page so as to allow for web pages to change content dynamically without the need to reload the entire page. So, Ajax requests on the client side are used frequently in Web applications to improve users' experience.

SUMMARY

Example embodiments of the present disclosure disclose methods, systems, and computer program products for reusing ongoing reusable Ajax requests.

In an aspect, a method is disclosed. According to the method, one or more processors receive a first Ajax request in a web application. The method further includes detecting at least one ongoing Ajax request comprising a second ongoing reusable Ajax request. The second ongoing Ajax request may be substantially similar to the first Ajax request. The method further includes receiving the second ongoing reusable Ajax request from a server of the web application. The method further includes executing a call-back function of the second ongoing reusable Ajax request.

In another aspect, a computer-implemented system is disclosed. The system may include a computer processor coupled to a computer-readable memory unit, said memory unit comprising instructions that when executed by the computer processor implements a method. According to the method, one or more processors receive a first Ajax request in a web application. The method further includes detecting at least one ongoing Ajax request comprising a second ongoing reusable Ajax request. The second ongoing Ajax request may be substantially similar to the first Ajax request. The method further includes receiving the second ongoing reusable Ajax request from a server of the web application. The method further includes executing a call-back function of the second ongoing reusable Ajax request.

In yet another aspect, a computer program product is disclosed. The computer program product comprises a computer readable storage medium having program instructions embodied therewith. When executed on one or more processors, the instructions may cause the one or more processors to perform a method. According to the method, one or more processors receive a first Ajax request in a web application. The method further includes detecting at least one ongoing Ajax request comprising a second ongoing reusable Ajax request. The second ongoing Ajax request may be substantially similar to the first Ajax request. The method further includes receiving the second ongoing reusable Ajax request from a server of the web application. The method further includes executing a call-back function of the second ongoing reusable Ajax request.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 10 shows a second monitored result from a web developer tool, according to an embodiment of the present disclosure; and FIG. 11 shows a third monitored result from a web developer tool, according to an embodiment of the present disclosure.

Figure 1:
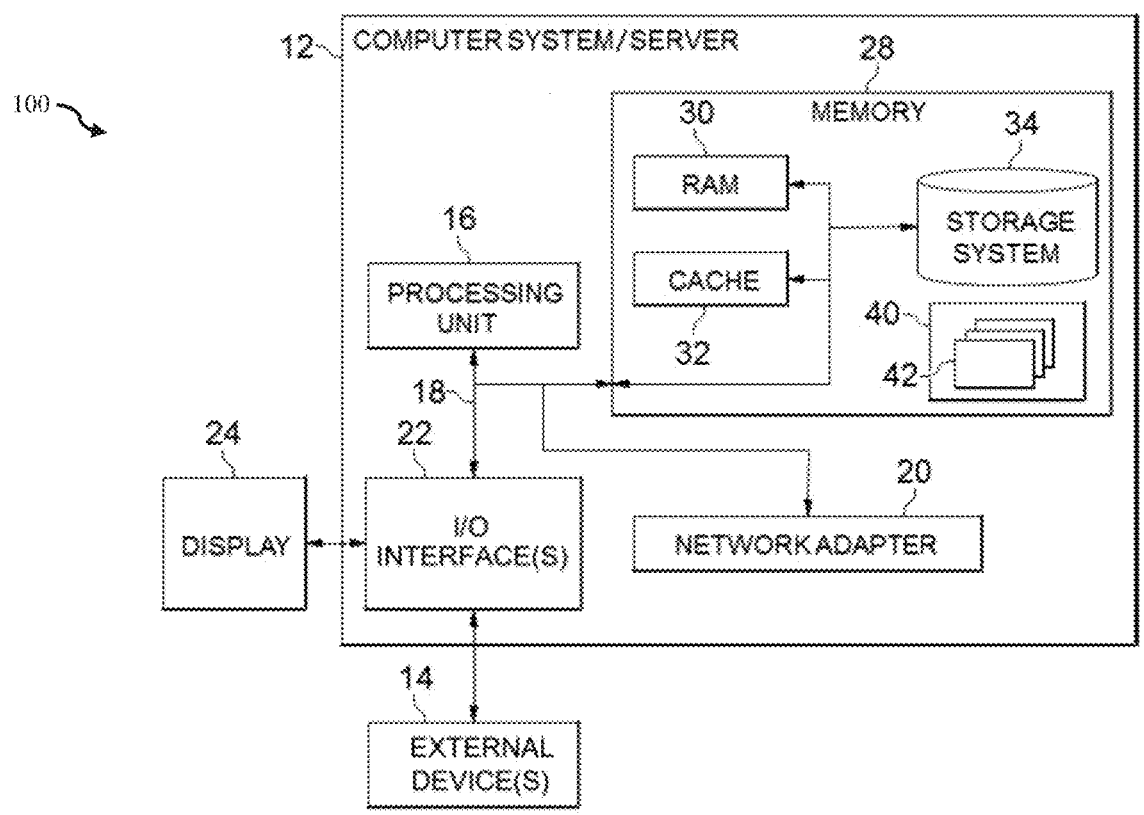
FIG. 1 depicts a cloud computing node, according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
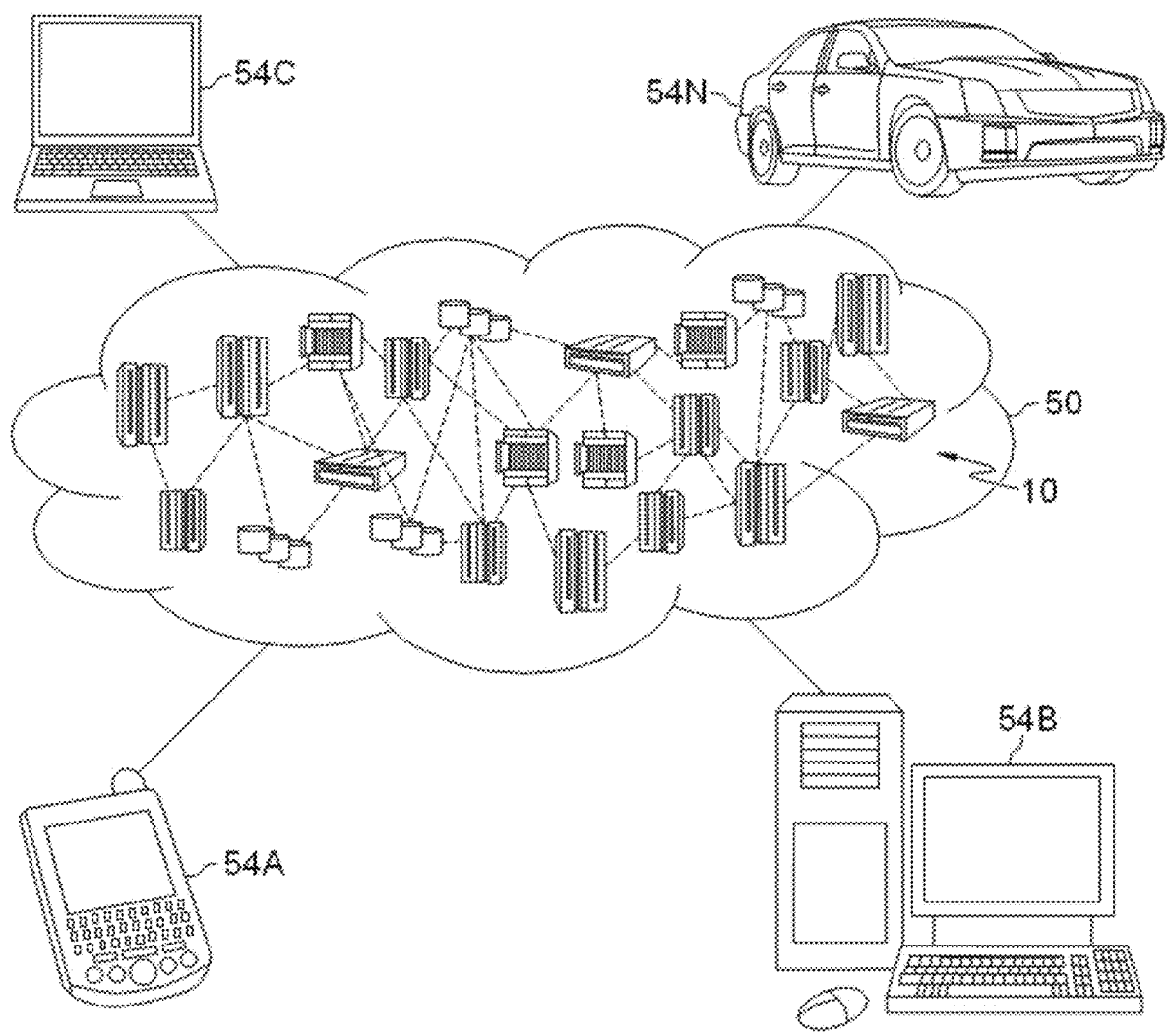
FIG. 2 depicts a cloud computing environment, according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
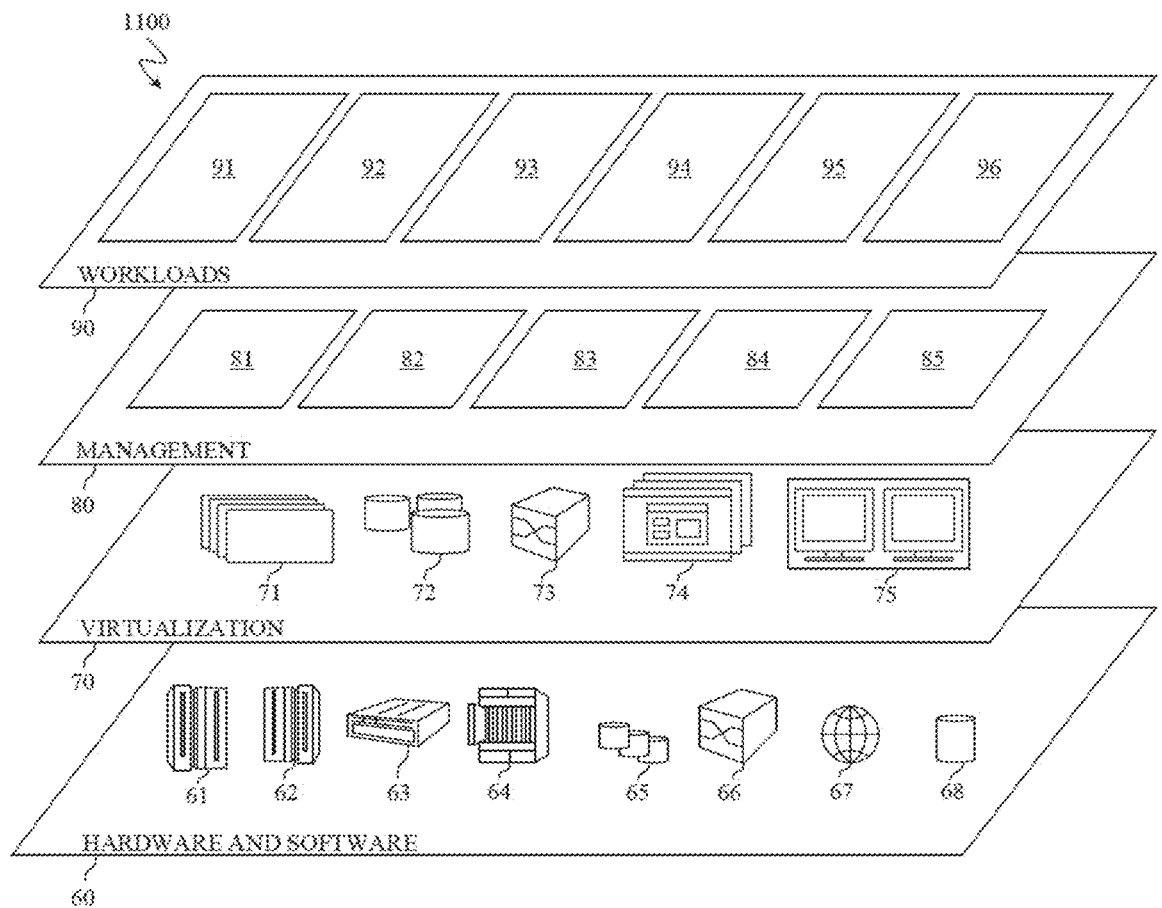
FIG. 3 depicts abstraction model layers, according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and ongoing reusable Ajax requests reusing 96.

When a web application is rendered in a web browser, typically, there is a limit on the maximum number of parallel ongoing connections that the browser makes to the same domain. The limit helps to ensure that servers in the same domain may not be overloaded by a small number of browsers and helps to avoid classifying a user as a DDOS attacker. Different browsers have different default settings of the maximum number of concurrent connections. For example, a first internet browser may send up to eight concurrent requests to a domain, while a second internet browser has a limitation of six.

With this limit, when loading cascading style sheets (CSS), JavaScript, images, Ajax resources, all these resources have to queue and compete for the connections available to be downloaded or requested. Static resources such as CSS, JavaScript, and images can be cached and only need to be downloaded for the first time. Mostly this limit impacts the control of Ajax requests, which can impact web page performance.

In order to reduce response time and provide a better user experience, most content of a web page may be loaded with numerous Ajax requests, and the data of each Ajax request may be used to render a fragment of the page separately. This approach is quite popular because it may let users feel the progress of page loading and enjoy some important parts of the web page's content while waiting for the rest of the page to load.

An Ajax request includes at least a requested URL, at least one method to be executed by a browser to a requested server in the URL, and call-back function(s) for updating a corresponding display area which can be executed by the browser after receiving a response from the requested server. And some Ajax requests may include a request body. An Ajax request can be completed after the following three steps: 1) connect to a server; 2) get response from the server; 3) execute the call-back function(s). Those skilled in the art can understand that an Ajax request may have a request body or not, so in the following examples, the request body will not be included.

Figure 4A:
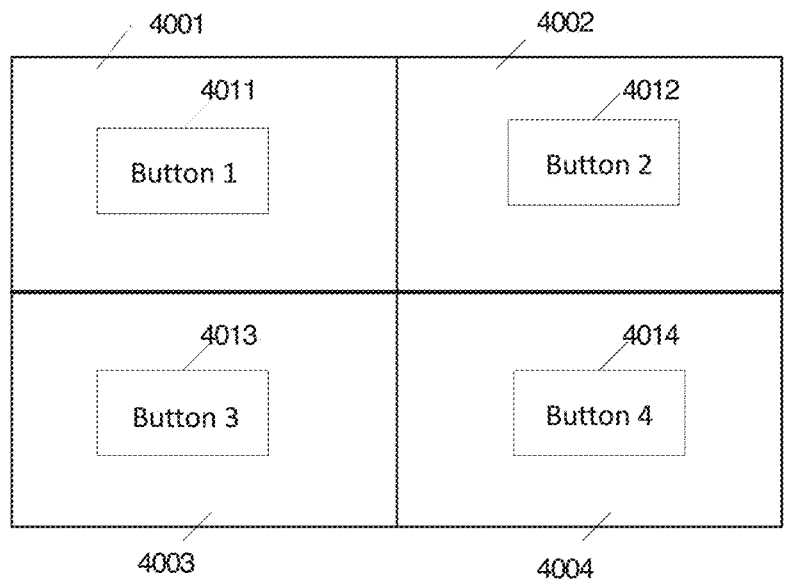
FIG. 4A depicts an exemplary diagram for illustrating a functional page for Ajax requests, according to an embodiment of the present disclosure.

FIG. 4A depicts an exemplary diagram for illustrating a functional page for Ajax requests. The functional page can be designated by developers in development process for a web application. Referring to FIG. 4A, button 4011, for example, is related to an Ajax request 1 whose call-back function(s) is responsible for updating display area 4001; button 4012 is related to an Ajax request 2 whose call-back function(s) is responsible for updating display area 4002; button 4013 is related to an Ajax request 3 whose call-back function(s) is responsible for updating display area 4003; and, button 4014 is related to an Ajax request 4 whose call-back function(s) is responsible for updating display area 4004. Because the four display areas 4001-4004 are different display areas, they can be updated independently, so developers may generally designate Ajax requests 1-4 in the same functional page. If a user presses button 1 and then button 2, the browser sends Ajax request 1 and then Ajax request 2 to a requested server respectively. Both Ajax request 1 and 2 could be executed in this case. But those skilled in the art can understand that the developers can also designate Ajax requests 1-2 in different functional pages. Then, if a user presses button 4011 and then button 4012, the browser should send Ajax request 1 to the requested server first and then Ajax request 2. In this case when the browser receives Ajax request 2, the browser cancels Ajax request 1 if Ajax request 1 has not been completed, and then sends the Ajax request 2 to the requested server.

Figure 4B:
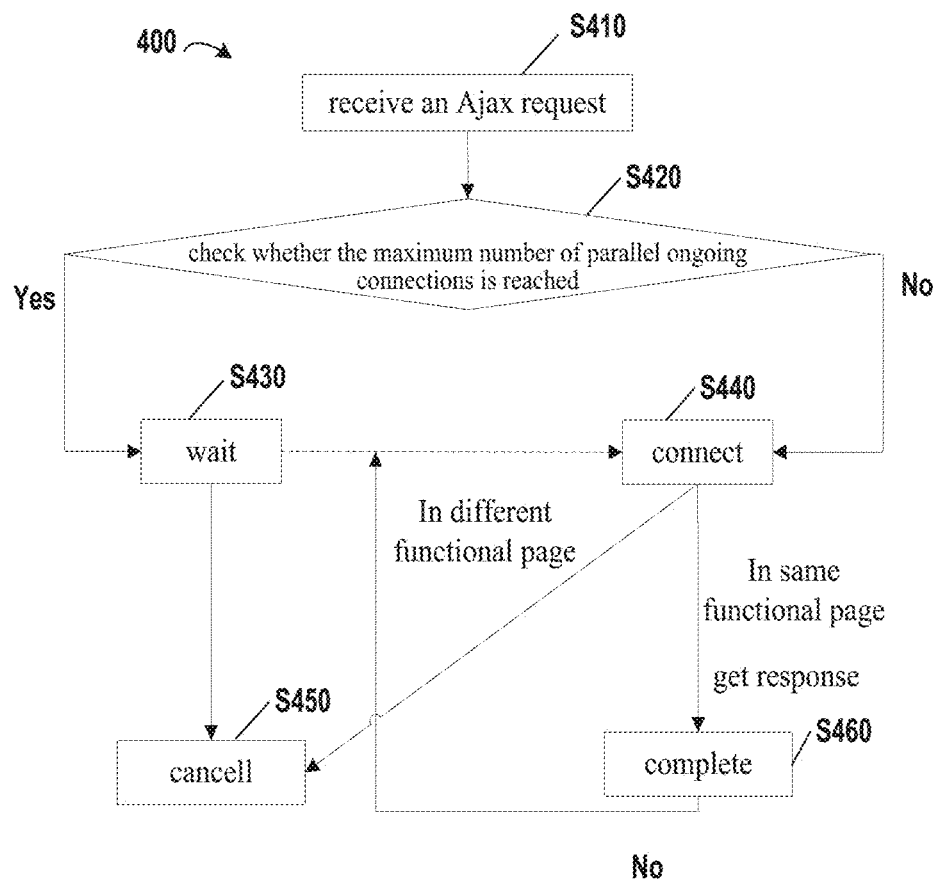
FIG. 4B depicts a flow diagram illustrating a method for processing an Ajax request in an existing browser, according to an embodiment of the present disclosure.

FIG. 4B depicts a flow diagram illustrating a method 400 for processing an Ajax request in an existing browser. Referring to FIG. 4B, once an Ajax request is received in the browser at step S410, the browser can check whether several parallel ongoing connections reach the maximum number of parallel ongoing connections supported by the browser at step S420. In some embodiments, the browser can check whether a connecting request queue is full, in which the size of the connecting request queue is equal to the maximum number of parallel ongoing connections. And if the answer of step S420 is yes, which means number of ongoing connections reaches the maximum number of parallel ongoing connections, then the Ajax request waits for a connection at step S430, for example, to be added to a waiting request queue to wait for a vacancy in the connecting request queue. Otherwise, the Ajax request makes a connection to a requested server at step S440, such as to be added to the connecting request queue to make a connection.

Continuing with the diagram of FIG. 4B, the continued processing for an ongoing Ajax request in the connecting request queue in the existing browser could be if (i) the Ajax request is received by the browser; (ii) there is no other Ajax request from a non-working functional page; (iii) and, the Ajax request has not been completed. In this case, then, the browser can send the Ajax request directly to the requested server. A call-back function(s) of the Ajax request can be executed after a response from the requested server is received, and then the Ajax request may be completed at step S460. In some cases, there may be a vacancy in the connecting request queue. An Ajax request in the waiting request queue can then be moved to the connecting request queue to make a connection to the requested server. If the Ajax request is received in the working functional page while there is another Ajax request(s) in the connecting request queue (which is a different functional page(s) Ajax request and has not been completed) the other ongoing Ajax request(s) can be cancelled at step S450—explicitly in the application's code by developers or implicitly by a browser engine. Then, the Ajax request can be sent to the requested server.

Therefore, if a user sends several of the same Ajax requests on the working functional page in a web application, the several Ajax requests on the working functional page may be executed multiple times. In addition, if the user switches, back and forth, between two functional pages, for example, two Ajax requests on different functional pages may be re-cancelled and re-sent multiple times. All these may lead to duplicate overhead, poor performance of a web browser, and unnecessary server-side workload, especially when some Ajax requests are time consuming. In addition, if a user navigates among several functional pages, the performance issue can be increased with bad user experience.

Embodiments of this disclosure includes methods, systems, and computer program products to reuse ongoing reusable Ajax requests to improve the above problems. A concept of a reusable Ajax request is proposed in this disclosure. If there exists a GET method in HTTP methods in an Ajax request, then the Ajax request is a reusable Ajax request. In addition, an Ajax request may be specified by the web application provider as a reusable Ajax request, for example, by adding a response header with a predefined value, and then the header of the Ajax request can be checked and, if that predefined value can be found, the Ajax request can be regarded as a reusable request as well.

In some embodiments, a score can be determined for a reusable Ajax request. In one embodiment, the score of the Ajax request can be related to both the response time and an access frequency of the Ajax request. Once a reusable Ajax request is initialized, the browser can record its response time in response to the Ajax request being completed and can record its access frequency in a predefined time period. With this information, a score can be calculated. There are many ways to calculate a score with these two pieces of information. For example, the longer the response time is, the higher the value of the score is, and the larger the value of the access frequency is, the higher the value of the score is.

In an embodiment, an average response time can be weighted more heavily than a single response time. The score can be calculated by dividing average response time by access frequency, which indicates how many times the same requests can be accessed in a period, which can be predefined by a user. For example, in a period of 5 minutes (300 seconds), the browser can determine that a same Ajax request was accessed 10 times and its average response time is 20 seconds, so its score can be 20/(300/10)=0.77. It should be known for those skilled in the art that the score may be determined in other ways.

In some embodiments, an existing score of an Ajax request can be updated once a new same Ajax request is completed. Those skilled in the art can understood that the score of an Ajax request can be updated based on other policies, for example, after a predefined duration, after a predefined number of the Ajax requests have been completed, and the like.

In some embodiments, all reusable Ajax requests for a specific web application can be stored and managed by the browser, for example, using a table. The browser can maintain a plurality of tables for a plurality of web applications, where each table corresponds to a particular web browser. It can be understood that all reusable Ajax requests for all web applications can be maintained in a table. Another data structure can be used instead of table, such as XML file, txt file, array, etc. Table 1 is an exemplary table for storing all reusable Ajax requests for all web applications. It can be understood that each application can maintain its own reusable Ajax requests. The information included in Table 1 includes, for example, a requested URL, a method and a score of a reusable Ajax request. Alternatively, Table 1 can also include a call-back function(s) of the Ajax request, and the like. Once a new reusable Ajax request not included in the Table 1 is received, the new reusable Ajax request can be registered into the Table 1. In an embodiment, once the new Ajax request is completed, its related information can be added to Table 1, and once the new Ajax request is completed again, its score in that column can be updated accordingly.

TABLE 1

| Requested URL | Method | Score |
|---|---|---|
| /resources/sddcs | GET | 7.7 |
| /resources/sddcs/1 | GET | 3.4 |
| /resources/vcenters | GET | 5.7 |
| /resources/vcenters/1 | GET | 3.8 |

In some embodiments, the browser can also maintain all ongoing reusable Ajax requests, including its requested URL, its method(s), and its call-back function(s). And in a further embodiment, the score, and/or the request body, and the like can be included. For example, information of all ongoing reusable Ajax requests can be stored using a table, and the browser can maintain a plurality of tables—each table corresponding to a web application of a plurality of web applications—or can maintain a table for the plurality of web applications. Another data structure may be used instead of a table, such as XML file, txt file, array, etc. Table 2 is an exemplary table for storing all ongoing reusable Ajax requests for a specific web application. Once an Ajax request in Table 2 is completed, the Ajax request can be deleted from Table 2. In an embodiment, Table 2 can be used to query an ongoing reusable Ajax request with the lowest score of all ongoing Ajax requests by composing Table 1, in which scores can be obtained. In an embodiment, Table 2 can include the scores of the ongoing reusable Ajax requests.

TABLE 2

| Requested URL | Method | Call-backs |
|---|---|---|
| /resources/sddcs | GET | refreshSddcTable |
| /resources/sddcs/1 | GET | refreshSddcDetailPanel, refreshSddcTable |

It can also be known that a list of all ongoing reusable Ajax requests for a specific web application and a list of all reusable Ajax requests for a specific web application can be stored in the browser, or in a storage (e.g., memory 28). And their status can be checked or updated one by one by the browser.

Based on the above concept, once an Ajax request is received, if there is an ongoing reusable Ajax request which is the same as the received Ajax request, the ongoing reusable Ajax request can be reused to accelerate loading the page, improve the web application performance, and reduce the workload of the web server as well. Embodiments of the present disclosure can be used to design a new web browser, or to provide a plug-in for existing web browsers.

Figure 5:
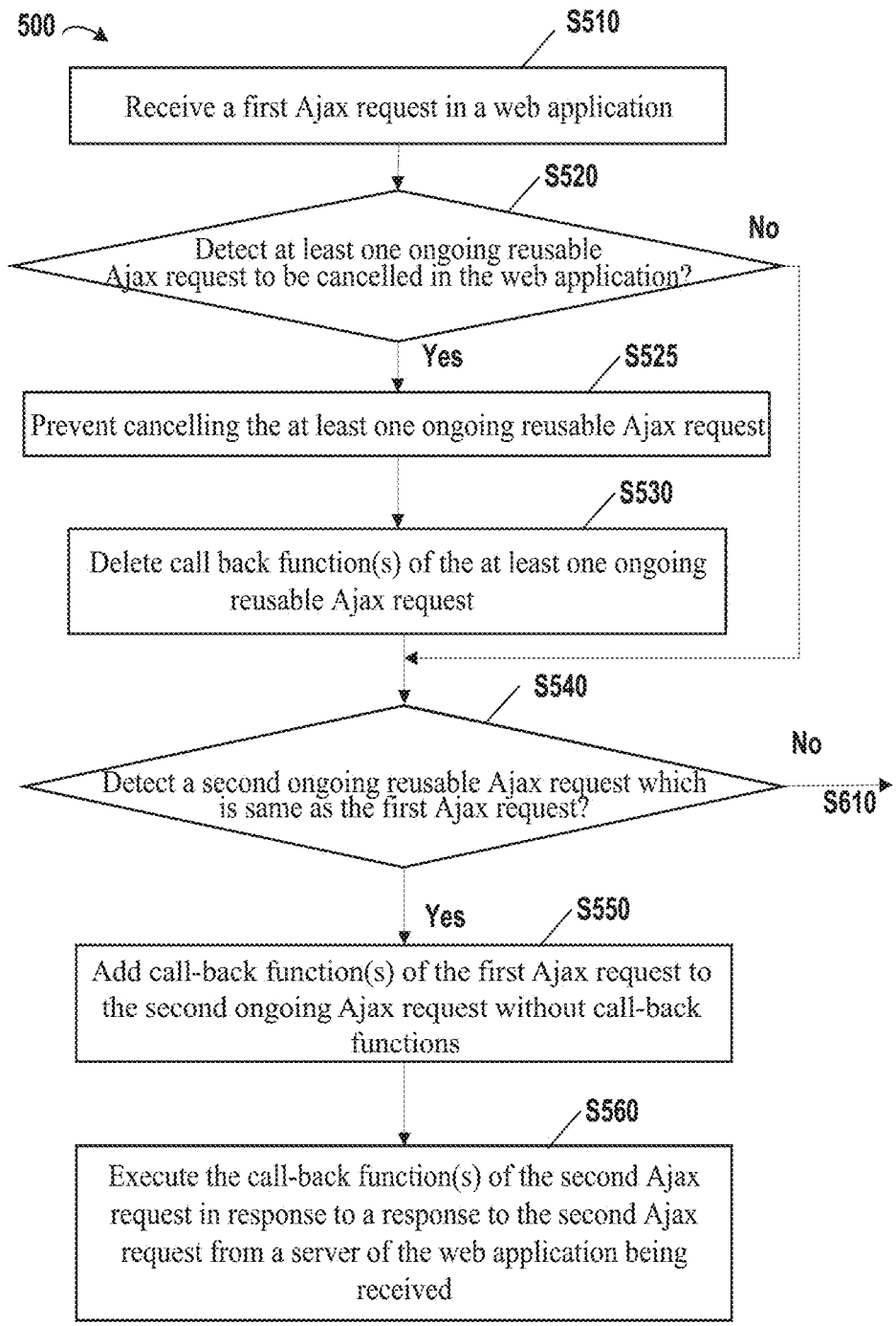
FIG. 5 depicts a flow diagram illustrating a method for reusing an ongoing reusable Ajax request in a browser, according to an embodiment of the present disclosure.

FIG. 5 depicts a flow diagram illustrating a method 500 for reusing an ongoing reusable Ajax request in a browser, according to an embodiment of the present disclosure. Referring to FIG. 5, the process can begin at step S510 in which a first Ajax request in a web application can be received in a browser. In some embodiments, the method 500 can proceed to step S520 in which the browser can detect whether there is at least one ongoing reusable Ajax request which was requested to be cancelled in the web application. In other words, the at least one ongoing reusable Ajax request may not be in the working functional page. If yes, the method 500 can proceed to step S525 in which the browser can prevent cancelling the at least one ongoing reusable Ajax request. If no, the method 500 may proceed to step S540 in which the browser can detect a second ongoing reusable Ajax request which is the same as the first received Ajax request.

After preventing the at least one ongoing reusable Ajax request from being canceled at step S525, the method 500 may then proceed to step S530 in which the browser can delete call-back function(s) of at least one ongoing reusable Ajax request if the at least one ongoing reusable Ajax request has the call-back function(s). This is because the call-back function(s) of the at least one ongoing reusable Ajax request may have been deleted before receiving the first Ajax request. For example, the call-back function(s) may have been deleted when receiving another earlier Ajax request in the web application. In some embodiments, step S530 may be optional.

The method 500 may then proceed to step S540 in which the browser can detect whether there is a second ongoing reusable Ajax request which is the same as the first Ajax request. In some embodiments, the first Ajax request can be compared with all ongoing reusable Ajax requests for this web application, for example, in Table 2, to determine if there is the second ongoing reusable Ajax request. In some embodiments, the browser can query Table 2 to check whether there is the second ongoing reusable Ajax request.

In some embodiments, if the call-back function(s) of the second ongoing reusable Ajax request has been deleted in step S530, the Step S560 cannot be executed, therefore the method 500 can alternatively proceed to step S550 before step S560, in which the browser can add call-back function(s) of the first Ajax request to the second ongoing reusable Ajax request.

Then the at least one ongoing reusable Ajax request can be kept alive until getting a response from a server, and then they may be completed and deleted from Table 2. For this duration, the at least one ongoing reusable Ajax request can be reused by adding call-back function(s).

In some embodiments, in response to detecting the second ongoing reusable Ajax request, the method 500 can proceed to step S560. There may be a call-back function(s) in the second ongoing reusable Ajax request, which is the same as the call-back function(s) of the first Ajax request. For example, both the first Ajax request and the second ongoing reusable Ajax request are related to the button 1 in the working functional page in FIG. 4A and the second ongoing reusable Ajax request is ongoing and has its own call-back function(s). The second ongoing reusable Ajax request instead of the first Ajax request can continue to connect to the requested server and wait for a response. Once the second ongoing reusable Ajax request gets a response from the server of the web application at step S560, the browser can execute the call-back function(s) of the second ongoing reusable Ajax request, which is equivalent to executing the first Ajax request. The location of the web page corresponding to the first Ajax request can then be updated. By using this method, the first Ajax request is not executed, which can save the time to set up a new connection with the server, and may also save part or total time of getting response from the server which is possible to be the longest time consumed.

Typically, a browser usually cancels all Ajax requests which are not in a working functional page in the web application but in the connecting request queue and which have not been completed (in other words, the Ajax requests are ongoing) if an Ajax request in the working functional page is received. This feature can be disabled to reuse an Ajax request in this disclosure.

Figure 6:
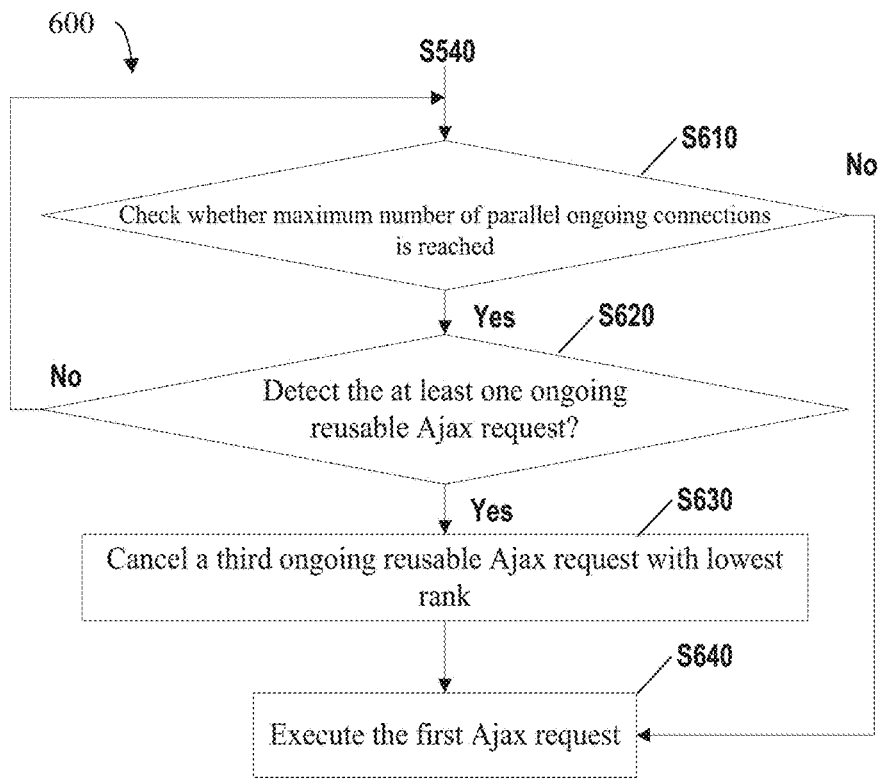
FIG. 6 depicts a flow diagram illustrating a method for cancelling an ongoing reusable Ajax request with lowest score in a browser, according to an embodiment of the present disclosure.

Still referring to FIG. 5, if the browser determines there is no second ongoing reusable Ajax request which is the same as the first Ajax request at step S540, then the process can go to step S610 in FIG. 6, in which a flow diagram illustrating a method 600 for cancelling an ongoing reusable Ajax request with a lowest score in a browser is depicted, according to an embodiment of the present disclosure. The method 600 can proceed to step S610 first, in which, similar to step S420, the browser can check whether a number of ongoing connections reaches a maximum number of parallel ongoing connections. If no, then the method 600 can go to step S640 in which the browser can execute the first Ajax request directly, i.e., connect to the server of the web application, wait for the response, and execute its call-back function(s). However, if the answer of step S610 is yes, that means the connecting request queue is full, then the method 600 can go to step S620 in which the browser can check whether there is the at least one ongoing reusable Ajax request. If the answer of step S620 is no, the first Ajax request can be put into the waiting request queue, then the process can go back to step S610 to continue to check whether a number of ongoing connections reaches the maximum number of parallel ongoing connections. Otherwise, the browser may cancel one of the ongoing reusable Ajax request(s) to satisfy the requirement of the browser for a parallel ongoing connection number to execute the first Ajax request. So, the process can next go to step S630 in which the browser can cancel a third ongoing reusable Ajax request with a lowest score, and then to step S640 in which the browser can execute the first Ajax request. In some embodiments, scores of all ongoing reusable Ajax requests can be maintained in the browser, for example, in Table 1 or in Table 2, from which the browser can query and get the third Ajax request. And those skilled in the art can understand that scores of all ongoing reusable Ajax requests can be maintained in other ways.

Figure 7:
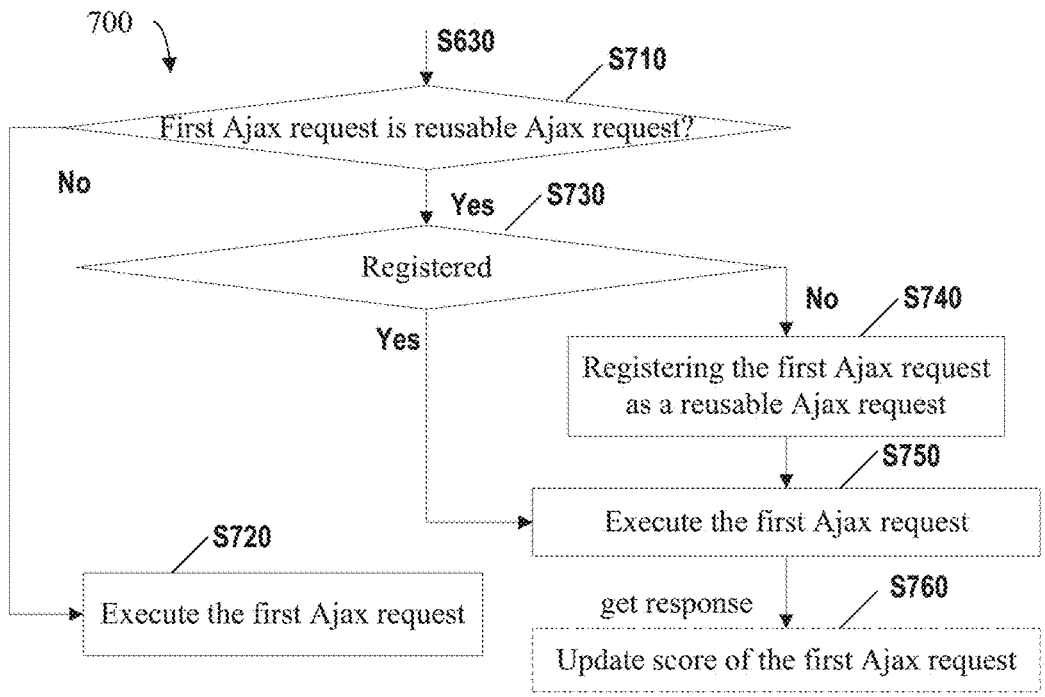
FIG. 7 depicts a flow diagram illustrating a method for executing step S640 in FIG. 6 in detail, according to an embodiment of the present disclosure.

Turning now to FIG. 7, a depiction of a flow diagram for executing step S640 in FIG. 6 in detail can be seen, according to embodiments of the present disclosure. Referring to FIG. 7, the process can go to step S710 in which the browser can check whether the first Ajax request is a reusable Ajax request, for example, by checking whether there is a GET method or whether the first Ajax request has been defined as a reusable Ajax request by the web application provider. If the answer of step S710 is no, that means there is no need to maintain the status of the first Ajax request, so the process can go step S720 in which the browser can execute the first Ajax request. And if the answer of S710 is yes, the process can go to step S730 in which the browser can further check whether the first Ajax request has been registered into a reusable list. For example, to check whether there is a record for the first Ajax request in the above Table 1. If the answer of Step S730 is no, the process can go to step S740 in which the browser can register the first Ajax request as a reusable Ajax request. For example, the browser can create a record for the first Ajax request in Table 1 and Table 2 to maintain its status for further usage. Then the process can go to step S750 in which the browser can execute the first Ajax request. If the answer of Step S730 is yes, for example, there may have been a record for the first Ajax request in Table 1. Then the process can go to step S750 to add the first Ajax request into Table 2 and execute the first Ajax request. After the first Ajax request is completed, the record of the first Ajax request in Table 2 is deleted. In a further embodiment, if the first Ajax request receives a response from the requested server after step S750, the process can go to step S760 in which the browser can compute and update an existing score of the first Ajax request.

The method disclosed in this disclosure can improve Web Application performance and can provide better user experience.

Figures 8, 9:
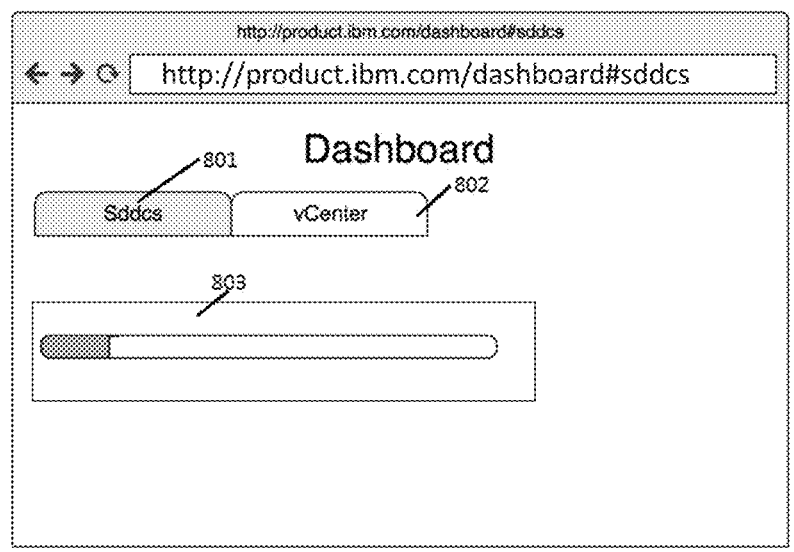
FIG. 8 depicts exemplary web application in which a user switches between two functional pages, according to an embodiment of the present disclosure.
FIG. 9 shows a first monitored result from a web developer tool, according to an embodiment of the present disclosure.

An example that includes the disclosed method is provided herein. FIG. 8 depicts an exemplary web application in which a user may switch between two functional pages according to an embodiment of the present disclosure. For example, button 801 is related to an Ajax request Sddcs (whose call-back function(s) is responsible for updating display area 803) in a first functional page and button 802 is related to an Ajax request vCenter (whose call-back function(s) is also responsible for updating display area 803) in a second functional page. Thus, developers usually designate Ajax request Sddcs and Ajax request vCenter in a different functional page, then if a user presses button 801 and then button 802, the browser sends Ajax request Sddcs to the requested server first and when receiving Ajax request vCenter, the browser cancels Ajax request Sddcs first if the Ajax request Sddcs has not been completed, then sends the Ajax request vCenter to the requested server. In other words, functional pages are designated in the code for a web application by the developers, when the web application is executed, the browser just focuses on Ajax requests in a working functional page and cancels Ajax requests not in the working functional page. And if the Ajax request is cancelled, its call-back function(s) can be removed and the Ajax request itself can be destroyed. The user may first click button 801, and the browser may send an AJAX request Sddcs to a requested server. A web developer tool can be opened to monitor the status of one or more Ajax requests.

FIG. 9 shows a first monitored result from the web developer tool. In other words, it can be found that there is an AJAX request GET/resources/sddcs 901 after pressing button 801, the status is pending shown in 902, e.g. waiting for a response. Because the Ajax request 901 may have a long response time, the user may become impatient to see its result, so the user may click button 802 again to try to send the Ajax request vCenter to a requested server. FIG. 10 shows a second monitored result from the web developer tool. The web developer tool can include that Ajax request GET/resources/sddcs 1001 (it is an exact request 901 in FIG. 9) is cancelled as shown by 1002, a new Ajax request GET/resources/vcenters 1003 is sent out by the browser, and the status of the request 1003 is pending as shown by 1004.

After some time, the user may want to return to see the result of the Ajax request Sddcs, so the user may click button 801 again. FIG. 11 depicts a third monitored result from the web developer tool. From FIG. 11, it can be found that although Ajax request 1103 (it is exact request 1003 in FIG. 10) has not been completed, the Ajax request 1103 is cancelled as shown by 1104, and Ajax request 1101 (it is exact request 901 in FIG. 9 and request 1001 in FIG. 10) is cancelled as well, as shown by 1102. An Ajax request Sddc 1105 (the same Ajax request as 901, 1001, or 1101) is sent out again, whose status is pending shown in 1106. Then, in the web developer tool, it can be found that the first two requests GET/resources/sddcs 1001 or 1101, GET/resources/vcenters 1003 or 1103 are cancelled, shown in 1102 and 1104 respectively, and the third one 1105 is sent out, whose status is pending shown in 1106.

And, at a substantially similar time, if the user returns to see the result of the Ajax request vCenter, the first three requests 1101, 1102 and 1103 are canceled and a new Ajax request GET/resources/vcenters will be sent out again. And if the user keeps switching between these two buttons, it can be imagined that more Ajax requests with the same requested URLs can be cancelled first and then sent out again.

In another example, if a user sends four same Ajax requests 901, the browser can build four independent connections by sending the same four Ajax requests, which also leads to duplicate overhead, poor performance in web browser and also unnecessary server-side workload especially when some Ajax requests are time consuming.

If the method disclosed in this disclosure is applied, Table 1 shows all reusable Ajax requests for the web application. When the user clicks button 801, the browser starts to send the AJAX request GET/resources/sddcs 901. Table 3 is the data shown in ongoing reusable request table for the application, similar to Table 2.

TABLE 3

| Requested URL | Method | Call-backs |
| --- | --- | --- |
| /resources/sddcs | GET | refreshSddcTable |

Since request 901 is a long request, the user may not want to wait to see its result, so the user clicks button 802. Ajax request 1001 is preserved rather than cancelled, but its call-back function refreshSddcTable is removed. And then Ajax request 1003 is also sent out. Then one row could be added in Table 3, as shown below.

TABLE 3

| Requested URL | Method | Call-backs |
| --- | --- | --- |
| /resources/sddcs | GET | |
| /resources/vcenters | GET | refreshvCenterTable |

After a period of time, the user may want to return to see the result of the Ajax request Sddcs, the user clicks button 801 again, the Ajax request vCenter is not cancelled but preserved with its call-back function(s) removed. When checking an ongoing reusable request table, it can be found in Table 3 that there is a same request GET/resources/sddcs that is ongoing, so no new request is created, but the call-back function refreshSddcTable is added to the existing request.

TABLE 3

| Requested URL | Method | APPENDIX A Call-backs |
| --- | --- | --- |
| /resources/sddcs | GET | refreshSddcTable |
| /resources/vcenters | GET | |

After a while, the Ajax request sddcs may receive a response. The system finds its call-back function, and then executes the call-back function. Then, the Ajax request can be deleted from Table 3. At this time, if the user presses button 802 again, because the Ajax request vCenter is already in the ongoing reusable request table, no new request is sent out but the call-back function is added, as shown below.

TABLE 3

| Requested URL | Method | APPENDIX B Call-backs |
| --- | --- | --- |
| /resources/vcenters | GET | refreshvCenterTable |

After the response of the Ajax request vCenter is received, the system finds its call-back function refreshvCenterTable, and then executes the call-back function. By using the method in this disclosure, only two requests need to be sent out and users can get responses quickly for both of the functional pages by reusing the previous connections.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by one or more processors, a first Ajax request in a web application;
detecting at least one ongoing reusable Ajax request comprising a second ongoing reusable Ajax request, wherein the second ongoing reusable Ajax request is substantially similar to the first Ajax request;
receiving the second ongoing reusable Ajax request from a server of the web application;
executing, by the one or more processors, a call-back function of the second ongoing reusable Ajax request;
in response to the at least one ongoing reusable Ajax request being requested to be cancelled in the web application:
preventing, by the one or more processors, cancelling the at least one ongoing reusable Ajax request; and
deleting, by the one or more processors, a call-back function of the at least one ongoing reusable Ajax request if the at least one ongoing reusable Ajax request has the call-back function.

2. The method according to claim 1, wherein executing, by the one or more processors, the call-back function of the second ongoing reusable Ajax request further comprises:
adding, by the one or more processors, a call-back function of the first Ajax request to the second ongoing reusable Ajax request.

3. The method according to claim 1, further comprising:
in response to the at least one ongoing reusable Ajax request not comprising the second ongoing reusable Ajax request being detected and number of ongoing Ajax requests being a maximum number of parallel ongoing connections supported by a browser in the one or more processors:
cancelling, by the one or more processors, a third ongoing reusable Ajax request with a lowest score from the at least one ongoing reusable Ajax request; and
executing, by the one or more processors, the first Ajax request.

4. The method according to claim 3, the method further comprising:
registering, by the one or more processors, the first Ajax request as a reusable Ajax request before executing the first Ajax request in response to the first Ajax request being a reusable Ajax request and not being registered as a reusable Ajax request.

5. The method according to claim 3, the method further comprising:
determining, by the one or more processors, the score of the first Ajax request in response to the first Ajax request being a reusable Ajax request and the response from the server of a web service being obtained.

6. The method according to claim 5, wherein determining the score of the first Ajax request is based on a response time of the reusable Ajax request and an access frequency of the reusable Ajax request in a predefined time.

7. The method according to claim 1, wherein the detecting the at least one ongoing reusable Ajax request comprises determining at least one of following: an Ajax request comprises a GET method and an Ajax request is defined as a reusable Ajax request by a web application provider.

8. A computing system comprising one or more computer processors coupled to a computer-readable memory unit, said memory unit comprising instructions that when executed by the one or more computer processors implement a method comprising:
receiving, by one or more processors, a first Ajax request in a web application;
detecting at least one ongoing reusable Ajax request comprising a second ongoing reusable Ajax request, wherein the second ongoing reusable Ajax request is substantially similar to the first Ajax request;
receiving the second ongoing reusable Ajax request from a server of the web application;
executing, by the one or more processors, a call-back function of the second ongoing reusable Ajax request;
in response to the at least one ongoing reusable Ajax request being requested to be cancelled in the web application:
preventing cancelling the at least one ongoing reusable Ajax request; and
deleting a call-back function of the at least one ongoing reusable Ajax request if the at least one ongoing reusable Ajax request has the call-back function.

9. The system according to claim 8, wherein executing, by the one or more processors, the call-back function of the second ongoing reusable Ajax request further comprises:
adding a call-back function of the first Ajax request to the second ongoing reusable Ajax request.

10. The system according to claim 8, the method further comprising:
in response to the at least one ongoing reusable Ajax request not comprising the second ongoing reusable Ajax request being detected and number of ongoing Ajax requests being a maximum number of parallel ongoing connections supported by a browser in the one or more computer processors:
cancelling a third ongoing reusable Ajax request with a lowest score from the at least one ongoing reusable Ajax request; and
executing the first Ajax request.

11. The system according to claim 10, the method further comprising:
registering the first Ajax request as a reusable Ajax request before executing the first Ajax request in response to the first Ajax request being a reusable Ajax request and not being registered as a reusable Ajax request.

12. The system according to claim 10, the method further comprising:
determining the score of the first Ajax request in response to the first Ajax request being a reusable Ajax request and the response from the server of a web service being obtained.

13. The system according to claim 12, wherein determining the score of the first Ajax request is based on response time of the reusable Ajax request and an access frequency of the reusable Ajax request in a predefined time.

14. The system according to claim 8, wherein the detecting the at least one ongoing reusable Ajax request comprises determining at least one of following: an Ajax request comprises a GET method and an Ajax request is defined as a reusable Ajax request by a web application provider.

15. A computer program product, the computer program product comprising a computer readable storage medium having program instructions embodied therewith, the program instructions executable by one or more processors to cause the one or more processors to implement a method comprising:
receiving, by one or more processors, a first Ajax request in a web application;
detecting at least one ongoing reusable Ajax request comprising a second ongoing reusable Ajax request, wherein the second ongoing reusable Ajax request is substantially similar to the first Ajax request;

receiving the second ongoing reusable Ajax request from a server of the web application;

executing, by the one or more processors, a call-back function of the second ongoing reusable Ajax request;

in response to the at least one ongoing reusable Ajax request being requested to be cancelled in the web application:

preventing cancelling the at least one ongoing reusable Ajax request; and deleting a call-back function of the at least one ongoing reusable Ajax request if the at least one ongoing reusable Ajax request has the call-back function.

16. The computer program product according to claim 15, wherein executing, by the one or more processors, the call-back function of the second ongoing reusable Ajax request further comprises:

adding a call-back function of the first Ajax request to the second ongoing reusable Ajax request.

17. The computer program product according to claim 15, the method further comprising:

in response to the at least one ongoing reusable Ajax request not comprising the second ongoing reusable Ajax request being detected and number of ongoing Ajax requests being maximum number of parallel ongoing connections supported by a browser in the one or more processors:

cancelling a third ongoing reusable Ajax request with a lowest score from the at least one ongoing reusable Ajax request; and executing the first Ajax request.

18. The computer program product according to claim 17, the method further comprising:

registering the first Ajax request as a reusable Ajax request before executing the first Ajax request in response to the first Ajax request being a reusable Ajax request and not being registered as a reusable Ajax request.

19. The computer program product according to claim 17, the method further comprising:

determining the score of the first Ajax request in response to the first Ajax request being a reusable Ajax request and the response from the server of a web service being obtained.

20. The computer program product according to claim 15, wherein the detecting the at least one ongoing reusable Ajax request comprises determining at least one of following: an Ajax request comprises a GET method and an Ajax request is defined as a reusable Ajax request by a web application provider.

* * * * *